R. MESTARS.
ANTISKID CHAIN.
APPLICATION FILED OCT. 23, 1917.

1,400,896.

Patented Dec. 20, 1921.
4 SHEETS—SHEET 3.

Inventor
ROBERT MESTARS
By Harry C. Schwede
Attorney

R. MESTARS.
ANTISKID CHAIN.
APPLICATION FILED OCT. 23, 1917.

1,400,896.

Patented Dec. 20, 1921.
4 SHEETS—SHEET 4.

Inventor
ROBERT MESTARS
By H. C. Schroeder
Attorney

UNITED STATES PATENT OFFICE.

ROBERT MESTARS, OF OAKLAND, CALIFORNIA.

ANTISKID-CHAIN.

1,400,896.  Specification of Letters Patent.  Patented Dec. 20, 1921.

Application filed October 23, 1917. Serial No. 198,059.

*To all whom it may concern:*

Be it known that I, ROBERT MESTARS, citizen of the United States, residing at Oakland, in the county of Alameda and State of California, have invented certain new and useful Improvements in Antiskid-Chains, of which the following is a specification.

The present invention is an improved anti-skid device for automobile tires.

The principal object of the invention is to provide a device of the chain type of tread that is easily and quickly put in place on a wheel and which is so constructed that it will conform more nearly to the shape of the wheel than any of the types now in use.

A further object is to provide in a non-skid chain a means of adjusting the circumferential measurement to avoid any rattling, looseness or slipshod appearance.

These objects are fully accomplished in the novel structure described in the following specification and illustrated in the accompanying drawings, in which, Figure 1 is a perspective side view of my invention.

Figure 1:
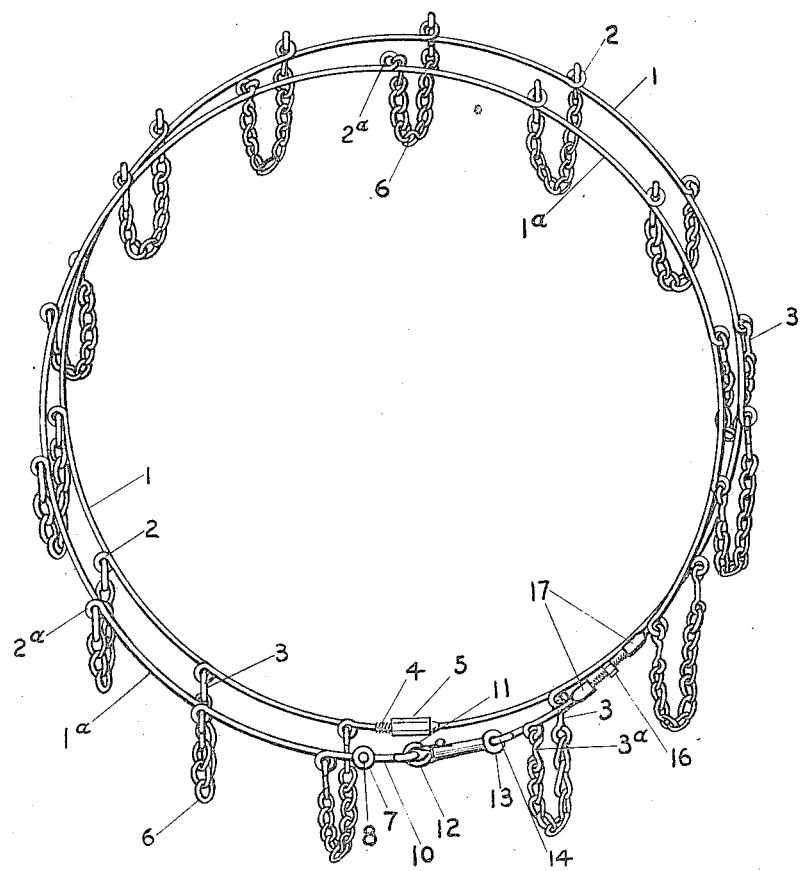
Figure 2:
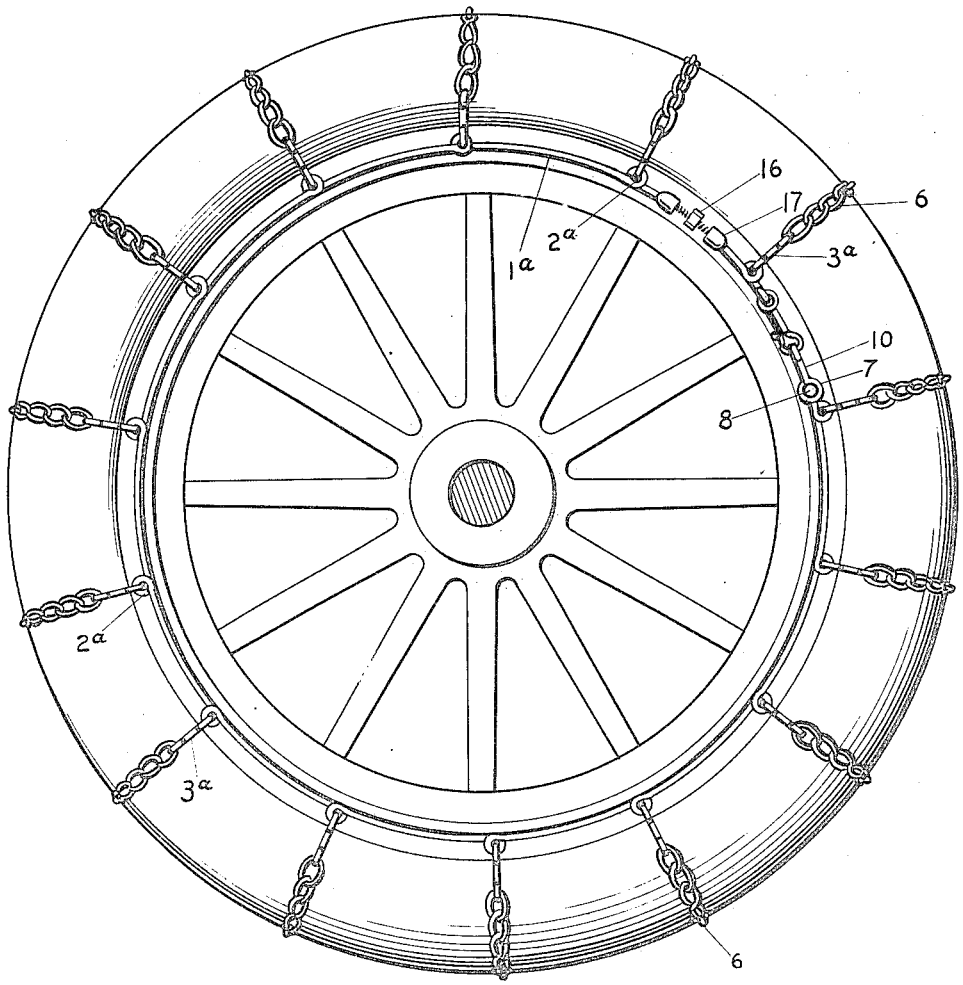
Fig. 2 is a side elevation of an automobile wheel with my device secured thereon.

Referring to the drawings, 1 indicates a ring of spring wire having at intervals of its circumference loops 2 for engaging eyes in ends of double eye links 3 which turn freely in the loops 2.

One end of the ring 1 is threaded as shown at 4 into an internally threaded sleeve 5 which turns freely on the opposite riveted end of the ring 1. The purpose of this construction is to provide a turnbuckle means for tightening the ring 1.

In each of the loops 2 is one eye of a double eye link 3, the opposite eye of which is linked to one end link of a chain 6 of sufficient length to surround the tire in a radial direction.

Into the opposite end link of the chain 6 is linked one eye of double eye links 3ª exactly similar to the links 3. The eye in the opposite end of the link 3ª is linked in a loop 2ª in a ring 1ª, similar to the link 1 throughout the greater portion of its circumference, but differing from the ring 1 at the turnbuckle.

One end of the ring 1ª terminates in an eye 7. Through the said eye 7 extends an eye 8 in a double eye link 10 whereby the link is pivoted in the eye 8. The link 10 has an eye 11 in its opposite end on a plane perpendicular to that of the eye 9 for engaging the hook of a snap 12. The snap 12 has a ring 13 at the end opposite the snap for engagement with a ring 14 in the end of the ring 1ª.

The ring A has suitably interposed in its circumferential length a turn-buckle 16 having rigid connection therewith, as at 17, and in effect forming a continuing part of the ring.

Figure 3:
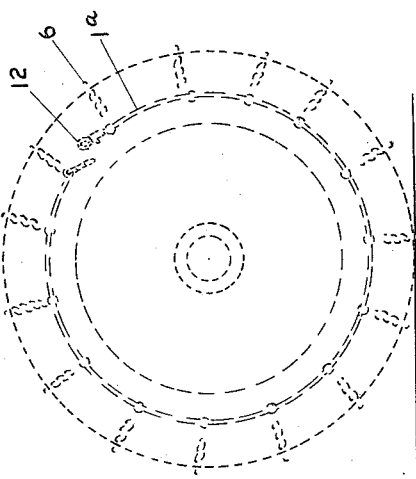
Fig. 3 is a view in side elevation of an automobile wheel and my anti-skid chain, the chain being shown partly placed on the wheel in full lines, and shown completely drawn on the wheel after the wheel has traveled forwardly a short distance in dotted lines.
Figure 4:
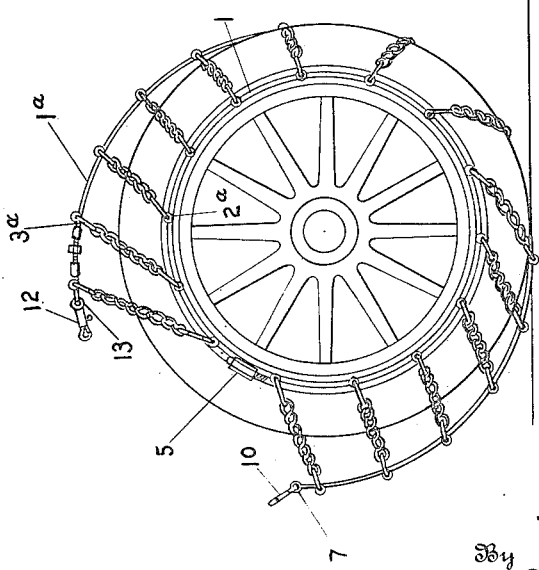
Fig. 4 is a plan view of the wheel and the invention illustrated in Fig. 3.

In placing my device on a wheel, the ring 1ª is opened as shown in Fig. 3 by unsnapping the snap 12. The ring is forced open to surround the inflated tire and the ring is placed in oblique relation to the path of the wheel as shown in the plan view, Fig. 4. The wheel is then turned in the direction of the arrow. As the wheel travels over the ring it encompasses the tire and assumes its normal shape because of the resiliency of the spring metal of which it is composed. It is then in the dotted position shown in Fig. 3 ready to be connected by the snap 12.

Figure 5:
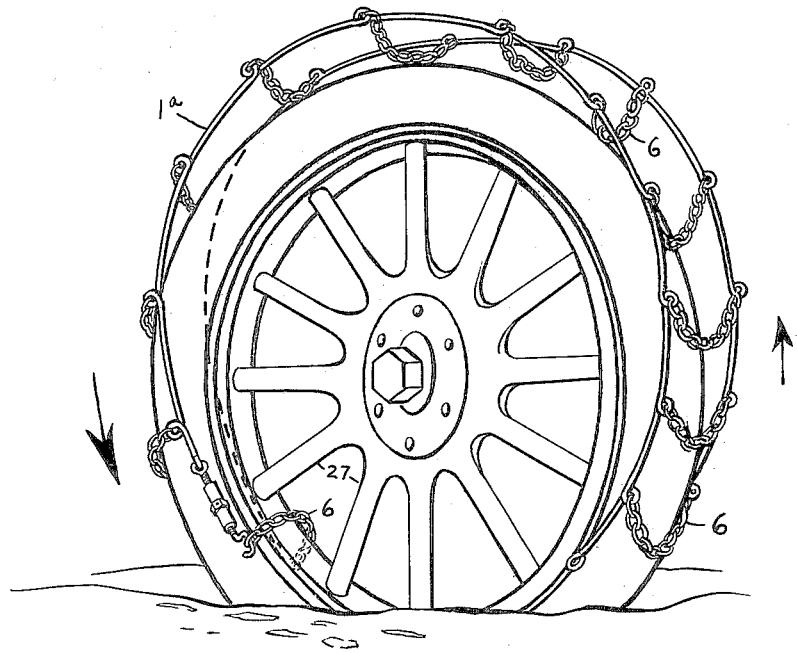
Fig. 5 is a perspective view of a modified form of my anti-skid chain disconnected at its ends and placed over the top of an automobile wheel and connected to the wheel so that it will place itself under the lower part of the wheel in the mud upon turning the wheel.
Figure 6:
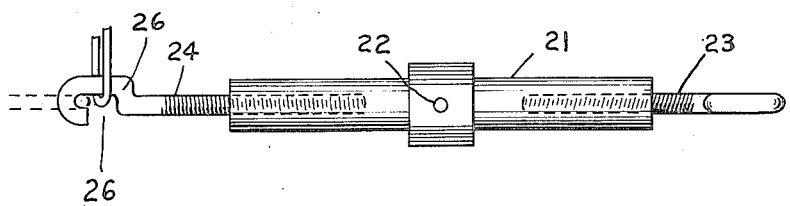
Fig. 6 is a view of one of the connecting elements of one of the rings of the chain shown in Fig. 5 with the end link of a cross chain shown engaging the hook of said element.

In Figs. 5 and 6, I have shown a modified form of turnbuckle, and the method of its use.

A sleeve 21 is provided with a hexagon nut or any suitable flat surfaced form to be engaged by a wrench and has a hole for engaging a tool to turn the sleeve. The sleeve 21 is internally threaded at each end in opposite directions to receive right and left threaded ends of eye bolts 23 and 24. The eye bolt 23 is provided with an eye for engagement with an eye in the end of one of the metal rings 1 or 1ª.

The bolt 24 has a hook for easy engagement with an eye in the ring 1ª.

The purpose of this is shown in Fig 5, in which a wheel is shown partially embedded in mud. To attach my device quickly the chain 6 is removed from the bolt 24 and passed between the spokes 27 inside the felly of the wheel. The rings 1 and 1ª are dropped loosely over the wheel and when power is applied to the wheel the chains will be drawn with the wheel and fall in their proper place ready for connection, and the wheel will be freed from the mud because of the traction afforded by the chains 6.

Having described by invention, what I claim as new and desire to secure by Letters Patent is:

1. An anti-skid device of the character described comprising a longitudinally inextensible rod bent into circular form, means adjustably connecting the ends of said rod, a second longitudinally inextensible rod also bent into circular form and having an eye at one end, a snap hook adjustably connected to the other end of the second rod and positioned to engage said eye, and tranverse chains connecting said rods, said rods possessing sufficient resilience to automatically expand in an arc greater than the diameter of the tire to be readily disengaged from the wheel when their ends are disconnected.

2. An anti-skid device of the character described comprising a ring, a longitudinally inextensible rod also bent into circular form, means for positively connecting the ends of the rod and permitting of adjustment, whereby the diameter of the ring formed by the rod may be varied at will, transverse chains connecting said rod and said ring, said rod possessing sufficient resilience to automatically expand it to an arc greater than the diameter of the tire on a wheel to be readily disengaged and applied to the wheel when the ends are disconnected.

3. An anti-skid device of the character described comprising a ring, a rod bent into circular form, means for positively connecting the ends of said rod, and transverse chains connecting said rod and said ring, said rod possessing sufficient resilience to automatically expand it sufficiently to be readily disengaged from the wheel when the ends are disconnected.

4. An anti-skid device of the character described comprising a longitudinally inextensible rod bent into circular form, a turnbuckle rigidly connected to the ends of said rod, a second longitudinally inextensible rod also bent into circular form, a turnbuckle having one end rigidly connected with one end of said second rod and the other end carrying means to positively connect the other end of the second rod whereby its ends are connected together, said rods possessing sufficient resilience to automatically expand sufficiently to be readily disengaged from the wheel when the ends are disconnected.

In testimony whereof I affix my signature.

ROBERT MESTARS.